United States Patent
Pedersen et al.

(10) Patent No.: US 10,424,036 B2
(45) Date of Patent: Sep. 24, 2019

(54) MAINTAINING DATA FOR USE WITH A TRANSPORT SERVICE DURING CONNECTIVITY LOSS BETWEEN SYSTEMS

(71) Applicant: Uber Technologies, Inc., San Francisco, CA (US)

(72) Inventors: Lars Soendergaard Pedersen, Aarhus (DK); Rene Wenzel Schmidt, Risskov (DK)

(73) Assignee: Uber Technologies, Inc., San Francisco, CA (US)

( * ) Notice: Subject to any disclaimer, the term of this patent is extended or adjusted under 35 U.S.C. 154(b) by 985 days.

(21) Appl. No.: 14/294,041

(22) Filed: Jun. 2, 2014

(65) Prior Publication Data
US 2015/0348221 A1 Dec. 3, 2015

(51) Int. Cl.
*G06Q 50/30* (2012.01)
*G06Q 10/06* (2012.01)
*G06Q 50/10* (2012.01)

(52) U.S. Cl.
CPC ......... *G06Q 50/30* (2013.01); *G06Q 10/0639* (2013.01); *G06Q 50/10* (2013.01); *G06Q 2240/00* (2013.01)

(58) Field of Classification Search
None
See application file for complete search history.

(56) References Cited

U.S. PATENT DOCUMENTS

| | | | |
|---|---|---|---|
| 5,694,322 A | 12/1997 | Westerlage et al. |
| 5,767,505 A | 6/1998 | Mertens et al. |
| 5,828,979 A | 10/1998 | Polivka et al. |
| 5,864,831 A | 1/1999 | Schuessler |

(Continued)

FOREIGN PATENT DOCUMENTS

| | | |
|---|---|---|
| CN | 1800783 A | 7/2006 |
| CN | 101136140 A | 3/2008 |

(Continued)

OTHER PUBLICATIONS

International Search Report/Written Opinion in related PCT/US2015/033801 dated Oct. 19, 2015.

(Continued)

*Primary Examiner* — Susanna M. Diaz
(74) *Attorney, Agent, or Firm* — Fenwick & West LLP (57) ABSTRACT

A system and method for operating a device for use with transport services is described. A record for a transport service is stored in a memory resource of the device. During performance of the transport service, the record is periodically updated with sets of information determined in connection with performance of the transport service at different instances in time, and the sets of information are periodically transmitted to a service system. In response to detecting a loss of network connectivity with the service system during performance of the transport service, the record is continued to be periodically updated but the sets of information are not periodically transmitted to the transport service system. Upon reestablishing network connectivity, one or more sets of information determined in connection with performance of the transport service during the loss of network connectivity is transmitted to the service system.

21 Claims, 5 Drawing Sheets (56) References Cited

U.S. PATENT DOCUMENTS

| | | | |
|---|---|---|---|
| 5,917,434 A * | 6/1999 | Murphy | G07B 13/00 |
| | | | 340/991 |
| 5,969,595 A | 10/1999 | Schipper et al. | |
| 6,002,981 A | 12/1999 | Kreft | |
| 6,179,252 B1 | 1/2001 | Roop et al. | |
| 6,184,802 B1 | 2/2001 | Lamb | |
| 6,236,933 B1 | 5/2001 | Lang | |
| 6,243,657 B1 | 6/2001 | Tuck et al. | |
| 6,340,934 B1 * | 1/2002 | Hisada | G08G 1/017 |
| | | | 235/382 |
| 6,401,034 B1 | 6/2002 | Kaplan et al. | |
| 6,421,587 B2 | 7/2002 | Diana et al. | |
| 6,484,094 B1 | 11/2002 | Wako | |
| 6,631,322 B1 | 10/2003 | Arthur et al. | |
| 7,009,501 B2 | 3/2006 | Olch et al. | |
| 7,143,241 B2 | 11/2006 | Hull | |
| 7,421,334 B2 | 9/2008 | Dahlgren et al. | |
| 7,525,427 B2 | 4/2009 | Mauriello | |
| 7,590,490 B2 | 9/2009 | Clark | |
| 7,692,655 B2 | 4/2010 | Ni | |
| 7,698,450 B2 | 4/2010 | Monroe et al. | |
| 7,714,705 B2 | 5/2010 | Rennie et al. | |
| 7,720,581 B2 | 5/2010 | Yaqub | |
| 7,733,371 B1 | 6/2010 | Monroe | |
| 7,783,516 B2 | 8/2010 | Stoffelsma et al. | |
| 7,957,871 B1 | 6/2011 | Echeruo | |
| 8,188,745 B2 | 5/2012 | Overby et al. | |
| 8,473,203 B2 | 6/2013 | Shin et al. | |
| 8,519,771 B1 | 8/2013 | Cical et al. | |
| 8,583,319 B2 | 11/2013 | Scott | |
| 2001/0025251 A1 | 9/2001 | Konishi et al. | |
| 2003/0189498 A1 | 10/2003 | Kakihara et al. | |
| 2004/0219932 A1 * | 11/2004 | Verteuil | H04L 12/14 |
| | | | 455/456.2 |
| 2005/0097018 A1 | 5/2005 | Takida | |
| 2005/0216187 A1 | 9/2005 | Hartinger | |
| 2005/0258978 A1 | 11/2005 | Hartinger | |
| 2006/0079248 A1 | 4/2006 | Otsuka et al. | |
| 2006/0200379 A1 | 9/2006 | Biet | |
| 2006/0229778 A1 | 10/2006 | Obradovich et al. | |
| 2006/0258367 A1 | 11/2006 | Chiang | |
| 2007/0067082 A1 * | 3/2007 | Watts | B60R 21/013 |
| | | | 701/45 |
| 2007/0275731 A1 | 11/2007 | Alfert et al. | |
| 2008/0039991 A1 * | 2/2008 | May | G05D 1/024 |
| | | | 701/25 |
| 2008/0040210 A1 | 2/2008 | Hedley | |
| 2008/0114707 A1 * | 5/2008 | Steiner | G01C 22/02 |
| | | | 705/417 |
| 2008/0195428 A1 | 8/2008 | O'Sullivan | |
| 2009/0138199 A1 | 5/2009 | Bonanni | |
| 2009/0157566 A1 | 6/2009 | Grush | |
| 2009/0234523 A1 | 9/2009 | Nandedka et al. | |
| 2010/0076878 A1 | 3/2010 | Burr et al. | |
| 2010/0109948 A1 | 5/2010 | Razoumov et al. | |
| 2010/0114475 A1 | 5/2010 | Shin et al. | |
| 2010/0131304 A1 * | 5/2010 | Collopy | G06Q 30/0224 |
| | | | 705/4 |
| 2010/0141261 A1 | 6/2010 | Overby et al. | |
| 2010/0287038 A1 | 11/2010 | Copejans | |
| 2011/0060600 A1 | 3/2011 | Fox et al. | |
| 2011/0099040 A1 * | 4/2011 | Felt | G06F 17/3087 |
| | | | 705/7.12 |
| 2011/0131238 A1 | 6/2011 | Camp et al. | |
| 2011/0136468 A1 | 6/2011 | McNamara et al. | |
| 2011/0282717 A1 | 11/2011 | Aschenbrenner et al. | |
| 2011/0313804 A1 * | 12/2011 | Camp | G06Q 10/02 |
| | | | 705/7.13 |
| 2012/0163662 A1 | 6/2012 | Lee et al. | |
| 2012/0185302 A1 | 7/2012 | Kim et al. | |
| 2012/0215594 A1 | 8/2012 | Gravelle | |
| 2012/0232800 A1 | 9/2012 | Overby et al. | |
| 2012/0232964 A1 | 9/2012 | Brands | |
| 2012/0323642 A1 | 12/2012 | Camp et al. | |
| 2013/0018581 A1 * | 1/2013 | Sidhu | G01C 21/16 |
| | | | 701/469 |
| 2013/0066483 A1 * | 3/2013 | Scott | G07C 5/002 |
| | | | 701/1 |
| 2013/0110345 A1 * | 5/2013 | Wilson | G01C 22/02 |
| | | | 701/31.4 |
| 2013/0110685 A1 | 5/2013 | Dempski | |
| 2013/0132246 A1 * | 5/2013 | Amin | G06Q 40/10 |
| | | | 705/34 |
| 2013/0185123 A1 | 7/2013 | Krivopaltsev et al. | |
| 2013/0185124 A1 | 7/2013 | Aaron et al. | |
| 2013/0219429 A1 | 8/2013 | Hirsch et al. | |
| 2013/0304276 A1 * | 11/2013 | Flies | G06F 17/00 |
| | | | 701/1 |

FOREIGN PATENT DOCUMENTS

| | | |
|---|---|---|
| CN | 102087709 A | 6/2011 |
| CN | 102128626 A | 7/2011 |
| CN | 102183256 A | 9/2011 |
| CN | 102435197 A | 5/2012 |
| EP | 0755039 A2 | 1/1997 |
| ES | 2115536 A1 | 6/1998 |
| JP | 2000-318613 A | 11/2000 |
| JP | 2011-075345 | 4/2011 |
| KR | 10-2009-0016782 | 2/2009 |
| KR | 10-2009-0093408 | 9/2009 |
| WO | WO 2008/145986 | 12/2008 |
| WO | WO 2014/066948 A1 | 5/2014 |
| WO | WO 2014-074407 | 5/2014 |

OTHER PUBLICATIONS

Australian Examination Report, Australian Application No. 2015271859, dated Jul. 22, 2017, 3 pages.
Australian First Examination Report, Australian Application No. 2014244449, dated Sep. 19, 2016, 3 pages.
Chinese First Office Action, Chinese Application No. 201480026212.5, dated Jan. 4, 2017, 32 pages.
CN Office Action dated May 6, 2016 in CN 2013800581997 (with Concise Explanation of Relevance).
CN Search Report dated Apr. 25, 2016 in CN 2013800581997.
European Extended Search Report dated May 31, 2016 in EP 13853974.7, 9 pages.
Goh, et al. Online Map-Matching Based on Hidden Markov Model for Real-Tme Traffic Sensing Applications, 2012, 6 pages, www.mit.edu/-jaillet/general/map_matching_itsc2012-final.pdf.
Krum, et al. Map Matching with Travel Time Constraints, 2006 SAE International, 11 pages.
Canadian First Office Action, Canadian Application No. 2,951,033, dated Sep. 26, 2017, 4 pages.
Chinese Second Office Action, Chinese Application No. 201480026212.5, dated Oct. 16, 2017, 50 pages.
Australian Second Examination Report, Australian Application No. 2014244449, dated May 2, 2017, 3 pages.
PCT International Search Report and Written Opinion, PCT Application No. PCT/US2014/025066, dated Jul. 18, 2014, 7 pages.
European Extended Search Report, European Application No. 15802674.0, dated Dec. 22, 2017, 8 pages.
Australian Government, IP Australia, Patent Examination Report No. 2, Australian Patent Application No. 2015271859, dated Mar. 2, 2018, three pages.

* cited by examiner

MAINTAINING DATA FOR USE WITH A TRANSPORT SERVICE DURING CONNECTIVITY LOSS BETWEEN SYSTEMS

BACKGROUND

A transport service system can arrange an on-demand service to be provided by a service provider for a requesting user through use of computing devices. The transport service system can receive, for example, information about a plurality of service providers from respective computing devices operated by the service providers, and select a service provider for the particular user based on the received information.

DETAILED DESCRIPTION

Examples described herein provide for a mobile device system that maintains data in connection with performance of a transport service (e.g., a trip) even during connectivity losses with a transport service system. During performance of the transport service, the mobile device system can periodically transmit information about the transport service to the transport service system. In some examples, the network connectivity between the mobile device system and the transport service system may be lost as a result of various circumstances. The mobile device system can continue to determine data about the transport service even during connectivity losses and can synchronize with the transport service system when network connectivity between the systems is reestablished, thereby providing the transport service system with necessary data pertaining to the performance of the transport service.

According to examples, the transport service system can periodically receive data about a transport service from a driver device as the driver performs the transport service. In examples described herein, a driver can operate a driver device that implements the mobile device system in order to receive transport service assignments from the transport service system. The transport service system can use data received from the mobile device system to determine if and when a client has been picked up and dropped off, for example, in order to properly determine a cost or fare for the transport service.

When network connectivity is lost between the driver device and the transport service system during the performance of the transport service, the transport service system may not receive the data necessary to determine the appropriate fare for the transport service (e.g., one or more location data points indicating a route and/or distance traveled by the driver). In such case, the client or user may be charged a minimum amount, for example, as opposed to a much higher (and correct) amount for the transport service, thus resulting in losses for the transport service provider. To prevent such losses, the mobile device system can locally maintain data in connection with the transport service during performance of the transport service to account for any connectivity losses with the transport service system. A synchronization mechanism can enable data pertaining to the transport service and not received by the transport service system to be provided to the transport service system when network connectivity is reestablished.

In one example, the mobile device system can store a record for a transport service in a memory resource of the mobile device. The record can be created at the mobile device in response to the transport service arranging the transport service between a requesting client and the driver operating the mobile device. The transport service system can maintain its own record of the transport service at its a local memory resource. During performance of the transport service, the mobile device can periodically update its record with sets of information determined in connection with performance of the transport service at different instances in time. Concurrently, the mobile device can periodically transmit the sets of information (or periodically transmit the most recent set of information determined by the mobile device at every period) to the transport service system over one or more networks. As used herein, "performance of a transport service" can refer to driver actions for providing the transport service starting from a time from when the driver accepts an invitation for the transport service until a time when the transport service is completed or canceled (either by the driver or the client). Thus, for example, the mobile device can periodically update the record from an instance in time after the driver accepts an invitation until the driver completes the transport service (e.g., the driver indicates via the mobile device that the trip has ended).

The mobile device can detect a loss of network connectivity with the transport service system during performance of the transport service. As used herein, "network connectivity" refers to the ability to make a connection between the mobile device and the transport service system (that is remote from the mobile device). In response to detecting the loss of network connectivity, the mobile device can continue to periodically update the record with sets of information determined in connection with performance of the transport service, but does not periodically transmit information about the transport service to the transport service system. The mobile device can maintain the record locally and mark or indicate, for example, in the record when the network connectivity loss occurred. Upon reestablishing network connectivity with the transport service (either during the performance of the transport service or after completion of the transport service), the mobile device can determine the length of time of the connectivity loss (e.g., the time of connectivity outage), and transmit, to the transport service system, information determined in connection with performance of the transport service during that time. The transport service system can then update its record of the transport service using the received information to obtain a complete record of the transport service.

As used herein, a client device, a driver device, a computing device, and/or a computing system refer to devices corresponding to desktop computers, servers, cellular devices or smartphones, laptop computers, tablet devices, etc., that can provide network connectivity and processing resources for communicating with other computing devices or systems over one or more networks. In some examples, a driver device can also correspond to taxi meters, other metering devices of a transit object (e.g., a vehicle), or custom hardware configured for a transit object. Client devices and the driver devices can also each operate a designated service application to communicate with a transport service system. Still further, while some examples described herein relate to transport services, the systems describe herein can be used to provide other on-demand services, such as a food truck service, a delivery service, an entertainment service, etc.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, laptop computers, printers, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
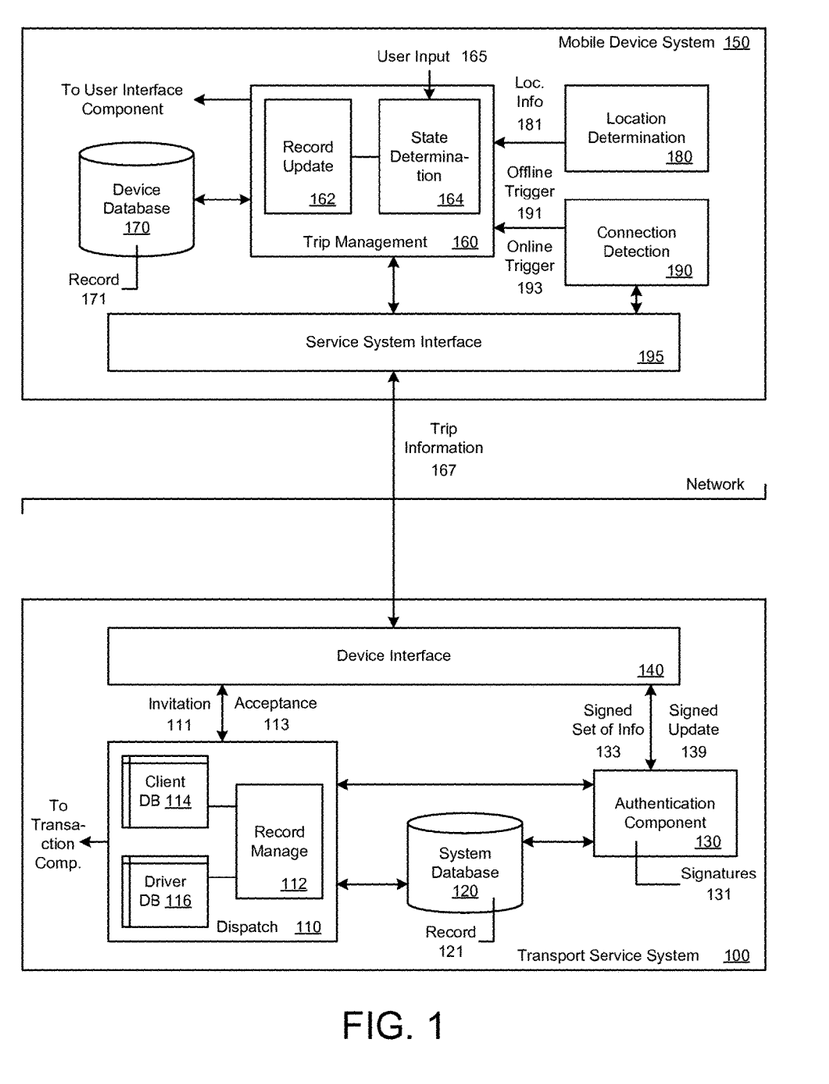
FIG. 1 illustrates an example system to maintain data for use with a transport service.

FIG. 1 illustrates an example system to maintain and store data for use with a transport service. According to an example, a transport service system 100 can communicate with a mobile device system 150 (and other mobile device systems, not shown in FIG. 1) for purposes of arranging a transport service between a user and a driver. In one example, the mobile device system 150 can be implemented by, via instructions stored in a memory resource, a mobile computing device, such as a driver device being operated by a driver. Typically, a network connection between the transport service system 100 and the mobile device system 150 is maintained in order to enable the transport service system to track the progress of the transport service. As discussed with an example of FIG. 1, the mobile device system 150 can maintain data about the performance of a transport service despite connectivity losses with the transport service system 100.

According to an example of FIG. 1, the transport service system 100 can include a dispatch component 110, a system database 120, an authentication component 130, and a device interface 140, and the mobile device system 150 can include a trip management component 160, a device database 170, a location determination component 180, and a connection detection component 190. The components of the transport service system 100 can combine to arrange a transport service between a client and a driver, and update a record for a transport service. In addition, the components of the mobile device system 150 can combine to periodically update a record for a transport service, detect if there is a loss of network connectivity between the mobile device system 150 and the transport service system 100, and if there is a loss of network connectivity, perform additional operations to enable data to be provided to the transport service system 100 when the network connection is reestablished. Logic can be implemented with various applications (e.g., software) and/or with firmware or hardware of a computer system that implements the transport service system 100 and/or a mobile device that implements the mobile device system 150.

Depending on implementation, one or more components of the transport service system 100 can be implemented on a computing device, such as a server or a datacenter, laptop, PC, etc., or on multiple computing devices that can communicate with other computing devices, such as client devices and driver devices, over one or more networks. One or more components of the mobile device system 150 can be implemented on a mobile computing device, such as a smartphone or tablet device, using instructions stored in memory of the mobile computing device. In some examples, a mobile computing device can operate or execute an application (e.g., a designated service application) to perform one or more of the processes described by the various components of the mobile device system 150. The systems 100, 150 can also be implemented through other computer systems in alternative architectures (e.g., peer-to-peer networks, etc.).

The transport service system 100 can communicate, over one or more networks via a network interface (e.g., wirelessly or using a wire), with client devices as well as driver devices using the device interface 140. The device interface 140 can enable and manage communications between the transport service system 100 and each of the client and driver devices for purposes of arranging transport services. As discussed, individual devices can implement, for example, the mobile device system 150, which can communicate with the transport service system 100. The service system interface 195 can enable and manage communications between the transport service system 100 and the mobile device system 150. For example, the device interface 140 and the service system interface 195 can enable a request and response protocol to be used between the transport service system 100 and the mobile device system 150.

In some examples, client devices and driver devices can individually operate a designated service application that can interface with the device interface 140 to communicate with the transport service system 100. In one example, the mobile device system 150 can be a part of or correspond to a designated service application running on a driver device. According to some examples, the applications can include or use an application programming interface (API), such as an externally facing API, to communicate data with the driver device interface 140. The externally facing API can provide access to the transport service system 100 via secure access channels over the network through any number of methods, such as web-based forms, programmatic access via restful APIs, Simple Object Access Protocol (SOAP), remote procedure call (RPC), scripting access, etc.

The dispatch component 110 can receive requests for transport from clients operating client devices (not shown in FIG. 1) and can select drivers from a plurality of available drivers to fulfill those requests. In one example, the dispatch component 110 can maintain or communicate with a client database 114 and a driver database 116. While the client database 114 and the driver database 116 are illustrated in FIG. 1 as being included in the dispatch component 110, in other examples, the databases 114, 116 can be generally included with the transport service system 100 and made accessible by the dispatch component 110.

The client database 114 can store a plurality of entries or profiles corresponding to a plurality of clients that have subscribed to or signed up with the transport service system 100, with each entry including a user identifier for that client, a device identifier for the client device operated by that client, contact information for that client, and/or payment information for that client. Similarly, the driver database 116 can store a plurality of entries or profiles corresponding to a plurality of drivers that have subscribed to or signed up with the transport service system 100, with each entry including a user identifier for that driver, a device identifier of the driver device operated by that driver, contact information for that driver, and/or vehicle information for that driver.

When the dispatch component 110 receives a request for transport from a client, the record manage 112 can generate a record 121 for the transport service for that client (e.g., a record for the client's trip). The record manage 112 can assign an identifier for that particular transport service to the record 121 (e.g., a trip identifier), and can also include an identifier of the requesting client. Such information, which is initialized by the record manage 112 when the dispatch component 110 receives a request, can be referred to as a set of initial service information. The set of initial service information (e.g., the trip identifier, the client identifier) can be stored with or as part of the record 121 for the transport service. The dispatch component 110 can then select a driver for that client based on a variety of information, such as the locations of the client and the driver and the driver's status (e.g., availability to perform the transport service). Although the record manage 112 is illustrated in FIG. 1 as being part of the dispatch component 110, in other examples, the record manage 112 can be a separate component from the dispatch component 110, and be a part of another component of the transport service system 100, such as a tracking component or the transaction component (not illustrated in FIG. 1).

Once the dispatch component 110 selects a driver, the dispatch component 110 can provide an invitation 111 to the selected driver's device via the device interface 140 (e.g., using the driver identifier or the device identifier). The mobile device system 150 operating on the driver device can receive the invitation 111 and provide a user interface (to be displayed on the driver device) indicating to the driver that a request for transport has been made and that the driver can accept the request. If the driver does not accept the invitation 111 within a predefined time or rejects the invitation 111, the dispatch component 110 can select another driver.

If the driver accepts the request via an input provided on the user interface, the mobile device system 150 can transmit an acceptance 113 for that particular request to the dispatch component 110 via the device and system interfaces 140, 195. As described herein, an input can correspond to a selection of a feature or user interface item that is displayed on a display device (e.g., a touch input via a touch-sensitive display device, or through physical input mechanisms). The record manage 112 can then include, in the record 121 for that transport service transaction, the driver identifier of that driver (e.g., the selected and accepting driver) as part of the set of initial service information. In some examples, the set of initial service information can also include fare details for the transport service of the client, such as a price or price factor (e.g., 1.5× or 2× of the default price), and/or vehicle information of the accepting driver. The record manage 112 can store the record 121 in the system database 120.

In response to creating the record 121 and determining the set of initial service information for the transport service, the transport service system 110 can provide the set of initial service information to the mobile device system 150 of the driver. Depending on implementation, when the mobile device system 150 receives the set of initial service information, the mobile device system 150 can create its own record (locally) for the transport service using the set of initial service information. In another example, the mobile device system 150 can initially create its own record in response to the driver accepting the invitation 111 for the transport service, and include the set of initial service information received from the transport service system 100.

As an addition or an alternative, the record manage 112 can provide the set of initial service information to the authentication component 130, which can perform a signing process on the set of initial service information for purposes of authentication and security. In one example, the authentication component 130 can include or access a database storing a plurality of signatures 131. The authentication component 130 can perform a signing process on the set of initial service information using a signature that is selected for the driver and/or is associated with the driver. For example, the signing process can include a hash function operation. The authentication component 130 can sign the set of initial service information using a hash function associated with the driver to obtain a signed set of initial service information 133 for that driver. Because the signatures 131 (and associated mappings to the drivers) are known only to the transport service system 100 as opposed to other devices or computing systems, for example, signing the set of initial service information can ensure a level of authentication for the transport service system 100. In another example, the authentication component 130 can also encrypt the set of initial service information or the signed set 133 using a key (e.g., a public key or a private key) for purposes of providing additional security.

The signed set 133 can later be used by the mobile device system 150, if necessary, to provide verification to the transport service system 100 that it has information of a valid transport service (e.g., a trip that was arranged by and originated from the transport service system 100). For example, if the transport service system 100 receives information about a transport service along with the signed set 133 from a mobile device system 150 at a later time, the authentication component 130 can perform an authentication process of the received signed set 133 using a signature 131 to verify that the received signed set 133 came from the appropriate driver device and/or that the information about the transport service is valid. The authentication component 130 can determine if the received signed set 133 has the same signature as the one used by the authentication component 130 to previously sign the set of initial service information. If the signatures match, the authentication component 130 ensures that the set of initial service information was created by the transport service system 100. The authentication component 130 can provide an indication to the record manage 112, for example, notifying the record manage 112 that the data from the received set of initial service information can be trusted.

As discussed, depending on implementation, the transport service system 100 can provide the set of initial service information or a signed set of initial service information 133 to the mobile device system 150 (a copy of the set of initial service information or a signed set 133 is hereinafter referred to as a "signed set 133" for simplicity). The trip management component 160 of the mobile device system 150 can receive the signed set 133 (via the device and system interfaces 140, 195) and store the signed set 133 in the device database 170 with or as part of a record 171 for the transport service (e.g., a record that is local to the driver device). Once the signed set 133 is stored in the device database 170 with the record 171, the record update 162 of the trip management component 160 can update the record with information pertaining to the performance of the transport service.

During performance of the transport service, the trip management component 160 can determine information in connection with performance of the transport service. The information can include, for example, state information for the driver/transport service and/or state changes (e.g., trip states) and location data points corresponding to the positions (and movement) of the mobile device. For example, as described herein, performance of the transport service can be determined to be initiated once a driver accepts an invitation for providing a transport service and is assigned for the particular client. Accordingly, the duration of the performance of the transport service can begin at or around the time the driver accepts the invitation and can continue until the transport service has been completed (e.g., the driver has dropped off the client at the client's destination location) or canceled/rejected (either by the driver or the client).

As the driver performs the transport service, the location determination component 180 can determine location data points (e.g., location information 181) corresponding to the driver device's current location at different instances in time (e.g., periodically). For example, the location determination component 180 can interface or communicate with a location aware resource of the driver's device, such as a global positioning system (GPS) resource of the driver's device, in order to determine the location information 181 periodically (e.g., every one, two, or three seconds, etc.). Each location data point can correspond to a latitude and a longitude coordinate determined by the GPS resource as well as a timestamp corresponding to the location data point. The location determination component 180 can provide the location information 181 to the trip management component 160 periodically. The trip management component 160 can store the location information 181 in a location table for the transport service (e.g., included with or associated with the record 171). In this manner, as the driver moves his or her vehicle (or remains stagnant), the trip management component 160 can continue to have approximate or close to real-time data about the driver device's current location.

In addition, the driver can provide inputs 165, via one or more user interface features that are provided on the display of the driver device, to indicate different trip states or ongoing phases that the transport service is in. For example, the different trip states (or state changes from one to another) can include: (i) transport service is accepted (e.g., driver accepts transport service request), (ii) driver is arriving now (e.g., driver is close to the client's pickup location), (iii) trip has begun (e.g., the fare has started as the client has entered the vehicle), (iv) trip has completed (e.g., the driver has arrived at the client's destination location to complete the fare), and (v) trip has been canceled or rejected (e.g., by the driver or the user). The state determination 164 can receive the user inputs 165 to determine the different states or phases of the transport service that the driver is currently providing. In one example, the state determination 164 can access or maintain a state table that includes the current state information for the driver on the trip. The state determination 164 can update the table when the state information is changed as a result of the driver's input 165. When the driver is not currently providing transport service (e.g., is available but has not yet accepted a fare), the state table can be cleared or emptied.

The record update 162 can periodically update the record 171 with information during performance of the transport service. For example, at periodic instances of time (e.g., every four seconds), the record update 162 can update the record 171 with a set of information, where the set of information can include a timestamp, a location data point at that time, and/or state information at that time. At time t=t1, for example, the record update 162 can update the record 171 with a timestamp for t1, a location data point of the driver device at time t1, and/or the state information of the transport service at time t1. Similarly, at the next period, at time t=t2 (e.g., four second later), the record update 162 can update the record 171 with a timestamp for t2, a location data point of the driver device at time t2, and/or the state information of the transport service at time t2. Because the record 171 is particular to the specific transport service, in one example, after the transport service has been completed or canceled (e.g., the performance of the transport service has ended), the trip management component 160 can continue to receive location information 181 from the location determination component 180, but may not update a record as the driver has not yet been assigned and has not yet accepted a new transport service. In this manner, the record 171 can represent the entirety and progress of the specific transport service provided by the driver for the specific client.

As an addition or an alternative, the trip management component 160 can maintain a plurality of tables stored in the device database 170. In one example, the device database 170 (or other databases not shown in FIG. 1) can correspond to a Structured Query Language (SQL) or SQLite database. The tables stored in the device database 170 can include (i) a state table, such as described above, (ii) an actions table, (iii) a trips table, and/or (iv) a locations table, such as described above.

As an example, the state table can store the current state of the driver or transport service while the transport service is being performed. The actions table can contain information about all states or state changes for the particular transport service (or for all transport services provided by the driver in a given duration of time, e.g., twenty four hours, a week, a month, etc.). The information about a state change in the actions table can include a trip identifier, a time for the change (e.g., an epoch time), the change (e.g., arriving now, on trip, trip completed, etc.), and/or a JavaScript object notation (JSON) field for other parameters, such as fare information. The trips table can contain the record 171 and/or the records of all the trips for the driver (or all the transport services provided by the driver in a given duration of time). Depending on implementation, the trips table can contain just the record 171 for the ongoing transport service, and not previously performed transport services. The locations table can store location data points determined during the ongoing transport service (and/or location data points determined for the transport services provided by the driver in a given duration of time). A location data point for a trip can include the time (e.g., epoch time), location information (e.g., latitude and longitude coordinate, accuracy or error value, etc.), and the trip identifier.

In some cases, the driver device and/or the service application running on the driver device may have to be reset or rebooted (e.g., as a result of a crash or glitch). Upon re-launching or opening the service application, for example, the state table can be queried, and if the state table is not empty, the service application can restore the mobile device system 150 by querying the actions table to determine the last recorded action for the trip and update the state table, if necessary, with the last current active state of the driver or transport service.

Referring back to FIG. 1, in some examples, the trip management component 160 can also periodically transmit information about the performance of the transport service (e.g., set of trip information 167) to the transport service system 100. The trip management component 160 can update the record 171 with a set of information determined in connection with performance of the transport service, as discussed above, and concurrently transmit a set of trip information 167 periodically to the transport service system 100. For example, the mobile device system 150 can periodically ping the transport service system 100 (e.g., periodically push data), the mobile device system 150 can periodically respond to requests from the transport service system 100, and/or the transport service system 100 can periodically pull data from the mobile device system 150. A set of trip information 167 can include data stored with the record 171, such as a trip identifier, a timestamp, a location data point, an error value for the location data point, and/or state information. Depending on implementation, multiple sets of trip information 167 can also be sent since the last successful time a set of trip information 167 was sent to the transport service system 100. In another example, a set of trip information 167 can also be sent with the signed set 133. The record manage 112 can periodically receive the sets of trip information 167 from the mobile device system 150 and update the record 121 with the sets of information determined in connection with the transport service.

According to examples, the record manage 112 can compare the trip identifier received with each set of trip information 167 with the records stored in the system database 120 to find the appropriate record 121 for the transport service with the matching trip identifier. In examples where the sets of trip information 167 are sent with a signature, the authentication component 130 can first perform a check using the signature(s) 131 to determine if the received set of trip information 167 has a corresponding signature. If the authentication component 130 determines that the received signature matches the previously stored signature for that trip identifier, then the authentication component 130 can enable the record manage 112 to process the received set of trip information 167. If the signatures do not match, the authentication component 130 can trigger and/or perform other security and auditing operations, such as flagging the mobile device system 150 that transmitted the message or sending a notification to the mobile device system 150 asking for additional verification.

In response to receiving a set of trip information 167, the record manage 112 can search the system database 120 to find the correct record to update. If the record manage 112 does not find a record in the system database 120 having the trip identifier from a received set of trip information 167, the record manage 112 can request the mobile device system 150 to provide a copy of the record 171 with all of its stored information as of that time. The trip management 160 can provide, at the next communication instance, a copy of the record 171 to the transport service system 100. The record manage 112 can store the copy or create a new record in the system database 120 and then continue to update that record with sets of trip information 167 subsequently received.

On the other hand, in one example, if the record manage 112 finds a record 121 in the system database 120 having the trip identifier from the received set of trip information 167, the record manage 112 can check the state information stored in its record 121 with the state information received in the set of trip information 167. If the two states of the driver or transport service matches, the record manage 112 can update the corresponding record 121 with the set of trip information 167. If the two states do not match, the record manage 112 can update its record 121 with the received state (e.g., under the assumption that the mobile device system 150 is accurate), and can update the corresponding record 121 with the set of trip information 167. In this manner, the transport service system 100 can maintain an up-to-date record 121 about the transport service for purposes of tracking the progress of the driver and/or the transport service and for purposes of determining the fare amount for the transport service (when completed or canceled after a duration of time by the client).

Depending on variations, the trip management component 160 can periodically determine sets of information and/or periodically update the record 171 with sets of information at a first rate, and periodically transmit the sets of information at a second rate. In one example, the first rate and the second rate can be identical so that the trip management component 160 periodically updates the record 171 with a set of trip information and transmits the set of trip information every four seconds (e.g., in staggered times or simultaneously). In another example, the first and second rates can be different so that a set of trip information is determined every two seconds, for example, while a set of trip information is transmitted to the transport service system 100 every four seconds. In such case, the most recent set of information can be transmitted periodically.

Still further, in another example, a set of trip information can be determined, recorded in the record 171, and/or transmitted to the transport service system 100 intermittently based on user input provided by the driver. For example, when the driver drives towards the client's pickup location and eventually approaches the pickup location (e.g., is a block away), the driver can operate the mobile device system 150 via the mobile device to provide a user input 165 on a user interface. The user input 165 can be a selection of a selectable feature on the user interface that changes the state of the transport service from the "accepted" state to the "arriving now" state. When the driver provides the input 165, the state determination 164 determines the change in the state, and the trip management component 160 can determine the current location information 181 and timestamp at this time. The trip management component 160 can update the record 171 (via the record update 162) and concurrently transmit the corresponding set of trip information 167 to the transport service system 100.

The trip management component 160 can transmit trip information 167 to the transport service system 100 provided that a network connection exists between the transport service system 100 and the mobile device system 150. The connection detection component 190 can communicate with or monitor the service system interface 195 to determine whether the mobile device system 150 maintains network connectivity with the transport service system 100. As discussed, "network connectivity" refers to the ability for the mobile device to transmit and/or receive packages to and/or from the transport service system 100. In various examples, the loss of network connectivity between the mobile device and the computing systems of the transport service system 100 can correspond to or result from a loss of cellular network connectivity (e.g., as a result of poor network signals from driving through a tunnel underground, or cellular system overload or outages), an outage of the data center of the transport service system 100 (e.g., a server outage), a failover of the data center of the transport service system 100, or a problem or glitch with the driver's device resources or service application.

If the connection detection component 190 detects a loss of network connectivity with the transport service system 100 during performance of the transport service, the connection detection component 190 can provide an offline trigger message or signal 191 to the trip management component 160. In response, the record update 162 can mark or record a time (e.g., in the record 171 or in another record or table) indicating when the network connection was lost. In addition, the trip management component 160 can continue to periodically update the record 171 with sets of information determined in connection with performance of the transport service, but stop transmitting the trip information 167 to the transport service system 100. As an alternative, the trip management component 160 can continue to periodically transmit the trip information 167 to the transport service system 100, but fail to receive a confirmation response from the transport service system 100 that the trip information 167 has been received (e.g., a successful response). As a result, the connection detection component 190 can determine that the network connectivity has been lost.

Depending on implementation, the trip management component 160 can provide a notification, as part of a user interface to be displayed on the driver device, indicating that the network connection with the transport service system 100 has been lost. In another example, however, no such notification is provided during the performance of the transport service (e.g., until completion of the transport service) so that network failures remain hidden from the driver. This can provide a more reliable experience for clients as the driver would be prevented from abandoning transport services under the presumption that the driver would not be properly paid for providing the service.

In addition, the trip management component 160 can provide different user interfaces to be displayed on the driver device based on the current state of the transport service. When the trip management component 160 receives the offline trigger 191, the trip management component 160 can also determine the current state of the transport service (e.g., by accessing the state table). For example, if the current state is in the "accepted" or "arriving now" state (before the "on trip" state where the client has been picked up) and the network connection is lost, the trip management component 160 can provide a prompt user interface advising the driver to call the client to verify the transport service, as the client may have canceled the trip and the mobile device system 150 may not have been notified due to the network connection outage. Similarly, the trip management component 160 can provide a prompt user interface advising the driver to call the client if the driver cancels the transport service. In another example, if the transport service is completed (e.g., change states from the "on trip" state to "completed" state) while the network connection is still lost between the mobile device and the transport service system 100, the trip management component 160 can provide another notification user interface to inform the driver that the network connection has to be reestablished and the last completed trip needs to be synchronized before the driver can be assigned a new transport service. The notification can also assure the driver that the synchronization can occur automatically and that the fare for the last trip will be correctly calculated and paid as normal.

During the network connection outage, the transport service system 100 would be unable to determine if the transport service is being performed or has been completed or canceled, or determine what state changes have been made during the transport service. As a result, the transport service system 100 would not be able to properly determine how long the driver has been providing transport service for the client, how many miles the driver has transported the client, or if the client should even be charged at all for the transport service (e.g., the driver may not have even picked up the client if the outage occurred before the driver reached the pickup location of the client). By maintaining the record 171 locally, the mobile device system 150 can update the record 171 periodically and then synchronize with the transport service system 100 at a later time in order to provide the missing (and important necessary) information to the transport service system 100.

In some examples, the connection detection component 190 can periodically check or ping the service system interface 195 to determine if the network connection with the transport service system 100 has been reestablished. In an alternative example, the connection detection component 190 can continue to check if a successful response has been received from the transport service system 100 indicating that the previous set of trip information 167 has been successfully received. Upon the network connection being reestablished between the mobile device and the transport service system, the connection detection component 190 can detect that the connection has been reestablished and transmit an online trigger message or signal 193 to the trip management component 160. In response, the trip management component 160 can determine the time the connection was reestablished, and determine a duration of time corresponding to the loss of network connectivity (e.g., the duration of outage). The trip management component 160 can access the record 171 to determine one or more sets of information in connection with the performance of the transport service that have not been transmitted to the transport service system 100 during this duration, and transmit the one or more sets of trip information to the transport service system 100. These one or more sets of trip information can include all state changes and/or all location data points of the transport service that have been determined by the mobile device system 150 since the last time a set of trip information was successfully transmitted to the transport service system 100.

The trip management component 160 can also determine if the online trigger 193 is received before or after the transport service has been completed or terminated. For example, if the network connection is reestablished during the performance of the transport service, the trip management component 160 can provide the one or more sets of trip information and then periodically continue to provide the trip information 167 to the transport service system 100 (such as done before the outage occurred).

Depending on various examples, the trip management component 160 can provide the one or more sets of trip information determined during the network outage to the transport service system 100 by transmitting at least a portion of the signed set 133 with the one or more sets of trip information, or by transmitting at least a portion of the signed set 133 with the a copy of the entire record 171 with the most up-to-date information as of the time that the network connection was reestablished (e.g., both of which are referred to in FIG. 1 as "signed update 139" for simplicity). According to an example, the authentication component 130 can receive the signed update 139 and perform an authentication process using the signed set 133 of the signed update 139 to verify that the signed update 139 is for a transport service that was arranged by the transport service system 100 (e.g., verify that the trip was generated by the transport service system 100).

The authentication component 130 can access a database storing a plurality of signatures 131, such as discussed, to determine whether the signed set 133 of the signed update 139 had been signed using the signature that had been previously selected for the driver and/or is associated with the driver. If the authentication component 130 determines that the signatures match, the authentication component 130 can indicate to the dispatch component 110 that the signed update 139 is valid information that is associated with the driver and/or the transport service. The authentication component 130 can also compare the trip identifier provided in the signed update 139 with the corresponding record 121. The authentication component 130 can determine that the signed update 139 corresponds to a trip or transport service that was generated by the transport service system 100. In this manner, the authentication component 130 can confirm or reject the signed update 139.

Once the signed update 139 is verified, the record manage 112 can use the one or more sets of trip information determined during the network outage by the mobile device system 150 to fill in the information gaps in its own record 121. The record manage 112 can update and complete the record 121, which was previously incomplete as a result of the network outage, to include up-to-date information about the transport service. In addition, the dispatch component 110 can continue to update the record 121 with trip information 167 provided as the transport service continues to be performed. When the transport service has been completed, the dispatch component 110 can provide the complete record 121 of that transport service to the transaction component, for example, so that the transaction component can use the data in the record 121 to properly determine the cost for the transport service. The record 121 can indicate the proper duration of the transport service and can indicate the proper route and/or distance traveled by the driver in performing the transport service. In this manner, even during long durations of network connectivity outages, the correct information pertaining to the transport service can be provided to the transaction component.

Depending on implementation, after the transport service has been completed, the trip management component 160 can automatically delete the record 171 (as well as the signed set 133) from the device database 170. In another example, the record 171 can be stored in the device database 170 for an unlimited amount of time or for a duration of time (e.g., a week, a month, a year, etc.) before being automatically deleted. Similarly, depending on variations, the dispatch component 110 can automatically delete the record 121 from the system database 120 after transport service has been completed, or maintain the record 121 in the system database 120 for an unlimited amount of time or for a duration of time (e.g., a week, a month, a year, etc.).

As an addition or an alternative, in some instances, the network connectivity outage can be a result of a system failure of a server or datacenter that implements the transport service system 100. In one example, the mobile device system 150 can determine that there is a system failure in response to the connection detection component 190 determining that network connection with the datacenter cannot be reestablished for greater than a predetermined amount of time. In response to such a determination, the mobile device system 150 can attempt to connect to another datacenter that implements the transport service system 100. If the driver device and the other datacenter establishes a network connection, the other datacenter that implements the transport service system 100 can perform similar operations as the previous datacenter and can receive a copy of the record 171 along with the signed set 133 in the manner discussed. This datacenter can implement the transport service system 100 in order to continue maintaining the information for the ongoing transport service for purposes of providing the correct trip information for that transport service to the transaction component once the transport service is completed.

For example, the transport service system can be implemented by a plurality of datacenters, where each datacenter can comprise one or more computing devices. Datacenters can be located in different geographic regions (e.g., west coast of the U.S. and east coast of the U.S.), and can perform parallel operations for the transport service system 100. When one datacenter fails, another datacenter can continue to perform operations for the transport service system. In one example described with FIG. 1, a first datacenter can implement the transport service system 100 and arrange a transport service for a client, as discussed. The first datacenter can store in its local memory resource, a record 121 for the transport service, including a signed set of initial service information 133 (e.g., a trip identifier, a client identifier, a driver identifier) that is signed using a signature 131 known to the first datacenter.

If, during performance of the transport service, network connectivity is lost between the first datacenter and the driver device implementing the mobile device system 150 as a result of a failover of the first datacenter (e.g., a long term outage), information about the transport service may not be received by the transport service system 100. In such case, the mobile device system 150 can connect to a second datacenter (that is separate from or remote from the first datacenter) that is active and implements the transport service system 100. The second datacenter, however, does not have information about the transport service for the client and the driver. As such, the second datacenter must receive a copy of the record 171 from the driver device to recreate its own record 121 of the transport service.

In order to provide additional data protection, the second datacenter can require that a copy of the record 171 (which includes the sets of trip information 167 determined by the mobile device system 150 in connection with the transport service) also be accompanied with a signed set of initial service information. The second datacenter can store the same signatures as the first datacenter and can perform an authentication process to verify that the record 171 is for a transport service that was originally created and arranged by the transport service system 100.

Methodology

Figure 2:
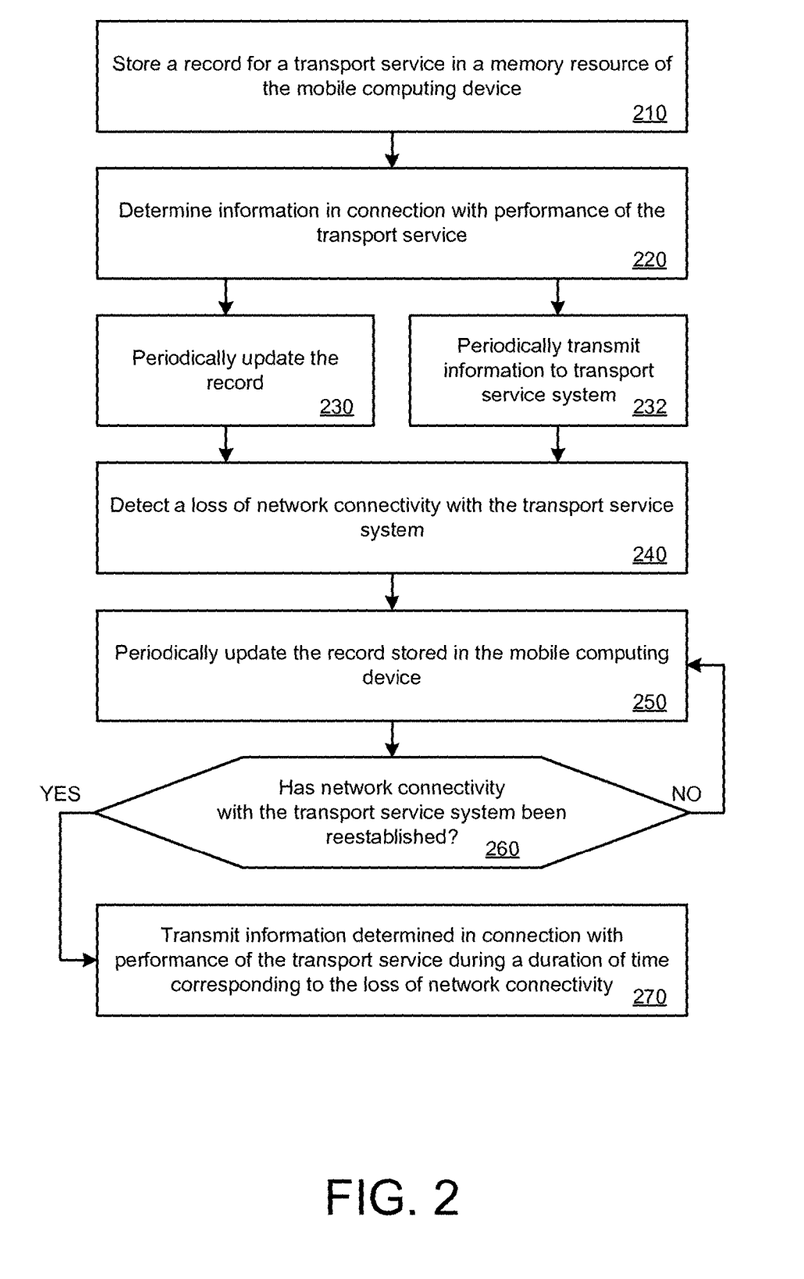
FIG. 2 illustrates an example method to maintain data for use with a transport service.

FIG. 2 illustrates an example method to maintain data for use with a transport service. A method such as described by an example of FIG. 2 can be implemented using components described with an example of FIG. 1, such as at least in part by a service application running on a computing device operated by a driver. Accordingly, references made to elements of FIG. 1 are for purposes of illustrating a suitable element or component for performing a step or sub-step being described.

Referring to FIG. 2, a transport service system can receive a request for a transport service from a user. In response, the transport service system can initialize information for the transport service, such as a set of initial service information including a trip identifier and a client identifier, create a record for that transport service that includes the set of initial service information, and send an invitation to a selected driver. A driver operating a driver device can accept the invitation for a transport service. Once the driver accepts the invitation, the transport service system can update the record with an identifier of the driver by including the driver identifier and/or vehicle information in the set of initial service information, store the record in a data store, and send the set of initial service information to the driver device. The driver device can receive the set of initial service information, create its own record for the transport service, include the set of initial service information in the record, and store the record in a local memory resource (210). In one example, the transport service system can sign the set of initial service information using a signature associated with the driver before sending the signed set to the driver device.

When the driver accepts the transport service invitation, the driver can begin moving toward a pickup location of the user (as indicated by the invitation). The driver or the transport service can be in an "en route" state (e.g., a state after accepting the invitation, but before the driver has arrived at the pickup location of the user) once the invitation is accepted via an input provided on a service application running on the driver device. As the driver performs actions or steps for providing the transport service, including driving towards the pickup location, the driver device can periodically determine information in connection with the performance of the transport service (e.g., a set of trip information) (220). Depending on implementation, a set of trip information in connection with the performance of the transport service can include a location data point (e.g., a current GPS location point) of the driver device, an error value of the location data point, a time stamp, a bearing, and/or a state of the driver or transport service.

The driver device can periodically update its record with the determined sets of information in connection with performance of the transport service (230) and can concurrently and periodically transmit the sets of information to the transport service system (232). Depending on implementation, a set of trip information can be transmitted to the transport service system along with an identifier of the trip and/or the identifier of the driver (or driver device). In addition, when a state change occurs (via the driver providing input to the service application), the driver device can also transmit the trip information to the transport service system. The transport service system can update its own record of the transport service with the trip information received to monitor the transport service, to ensure that the transport service is progressing as planned, and to properly perform an accounting of the transport service when the transport service is complete.

The driver device can continue to (i) determine trip information, (ii) periodically update its record, and (iii) concurrently and periodically transmit trip information to the transport service system while the transport service is being provided. In some instances, due to various conditions, the network connection between the driver device and one or more datacenters or computing devices that implement the transport service system can be interrupted or lost for a duration of time. The driver device can detect a loss of network connectivity (240) and determine a time when the loss occurs. According to an example, the driver device can include or indicate in its record a marker specifying when the loss of network connectivity occurred. The driver device can continue to periodically update its record with sets of trip information (250) without periodically transmitting the trip information (e.g., or without attempting to transmit the trip information) to the transport service system.

The driver device can periodically monitor the network interface, for example, to determine whether the network connection with the transport service has been reestablished (260). If the network connection has not been reestablished, the driver device continues to periodically determine sets of information in connection with the performance of the transport service and update its record without periodically transmitting the determined sets of information to the transport service system. When the network connection is reestablished and the driver device determines that the network connection has been reestablished, the driver device can determine a duration of time corresponding to the loss of the network connection and transmit one or more sets of information determined in connection with performance of the transport service during the duration of time (270). Depending on implementation, the information provided to the transport service system can be dependent on the current state of the driver or transport service.

Figure 3A:
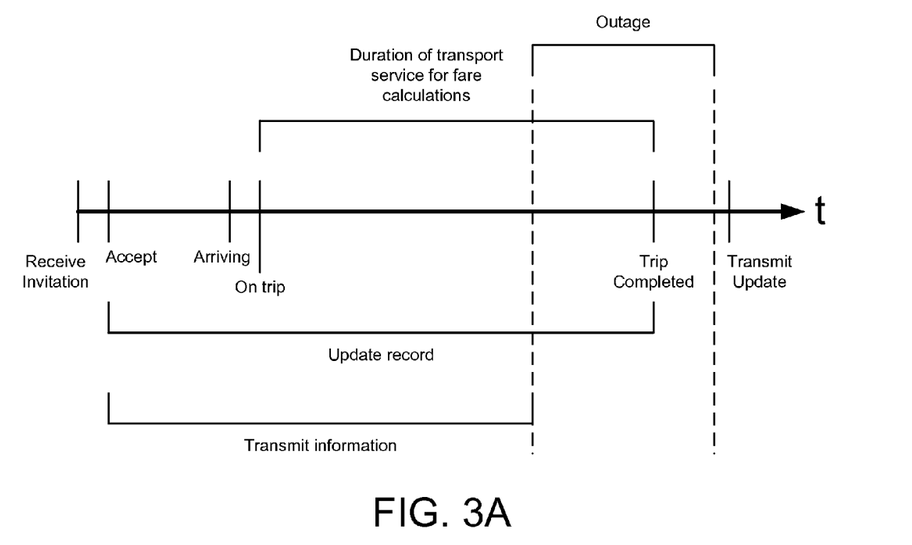
FIGS. 3A and 3B are example timing diagrams to illustrate examples described herein.
Figure 3B:
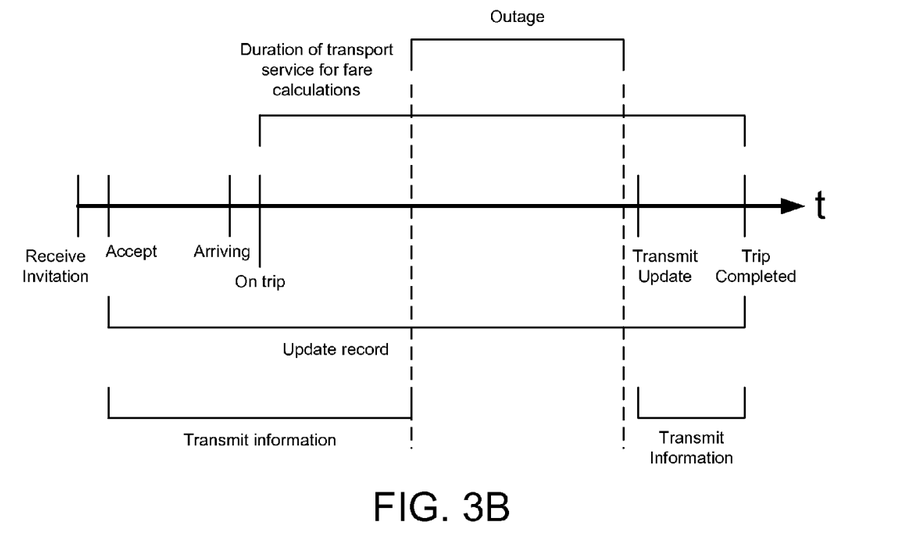

For example, FIGS. 3A and 3B are example timing diagrams to illustrate examples described herein. In FIG. 3A, the service application running on the driver device can receive, from a transport service system, an invitation to provide a transport service for a user. The driver can provide an input on the service application in order to accept the invitation (e.g., some instance in time after receiving the invitation). From a time when the driver accepts the invitation (e.g., the driver is now in the "en route" state), the service application can determine trip information about the transport service (e.g., as the driver moves from a current location to a pickup location of the user, as the driver picks up the user and travels to the user's destination location, etc.) and can periodically update the record for the transport service on the driver device. Concurrently, the service application can also periodically transmit the determined trip information to the transport service system (using resources of the driver device).

In the example of FIG. 3A, the record for the transport service is updated with the determined information even as the driver travels to the pickup location of the user. Similarly, the determined information is periodically transmitted to the transport service system as the driver travels to the pickup location of the user Once the driver determines that he or she is close to the pickup location, the driver can provide an input on the service application that he or she is "arriving" or "arriving now." In response to the service application receiving an indication of the state change (e.g., from "en route" to "arriving now"), the service application can also transmit a set of trip information including the state information to the transport service system. In another example, the transport service system can automatically determine (without driver input) that the driver is "arriving" based on a distance between the current location of the driver device and the pickup location of the user being equal to or less than a threshold distance.

The driver can provide an input on the service application indicating that the user has been picked up and that the trip has begun. Again, a state change has occurred, and the service application, in response, transmits a set of trip information including the new state information (e.g., "on trip") to the transport service system. From the time the driver indicates that the trip has begun, the duration of the actual transport service has begun for purposes of fare calculations. For example, the time it took for the driver to get to the user's pickup location may not factor into the total fare for the transport service. In FIG. 3A, while the driver is providing the transport service, a network connection outage may occur in which the network connection between the driver device and the datacenter of the transport service system may be lost. When the service application detects the network outage, the service application can continue to periodically update the record with information in connection with the transport service (e.g., the GPS location points, time stamps, state information, etc.). However, the service application stops transmitting the determined information to the transport service system.

In the example of FIG. 3A, the driver completes providing the transport service (e.g., reaches the destination of the user and drops the user off) and provides an input to the service application indicating that the trip has been completed. At this time, the transport service system has not received information pertinent to the transport service, including information of the completion of the transport service. In response to the service application receiving an input that the transport service has been completed, the service application can display a message (via a user interface or in-application message) informing the driver that the driver's last completed transport service needs to be synchronized with the transport service system, which is currently unreachable. When the network connection between the driver device and the datacenter is reestablished (at the end of the outage period, as shown in FIG. 3A), the service application can determine that connection has been reestablished and can transmit sets of trip information that had not been transmitted to the transport service system, including the latest set of trip information with the state information of completed trip. The sets of information can be transmitted individually or as a group, as a portion of the record, or as a copy of the record stored at the driver device. In addition, the sets of information can be transmitted along with a signed set of initial service information that was previously received by the service application when the transport service was accepted.

By receiving all relevant information about the transport service, despite the network outage, the transport service system can determine the duration of the transport service, the route, and the distance taken by the driver for purposes of calculating the fare.

FIG. 3B illustrates another timing diagram similar to the timing diagram of FIG. 3A, except that the network connection outage has occurred before the transport service has been completed by the driver. In FIG. 3B, when the network connection between the driver device and the datacenter is reestablished, the service application can determine that connection has been reestablished and can transmit sets of trip information that had not been transmitted to the transport service system. After the sets of information are transmitted to the transport service system, the service application continues to periodically determine new sets of information in connection with the ongoing transport service, periodically update the record at the driver device, and periodically transmit the determined sets of information to the transport service system as previously done before the outage occurred (e.g., transmit the update information). In addition, because the outage occurred during the transport service, the service application can hide any indication of a network connection outage, as the service application can automatically try to reestablish the network connection without driver input or action. Seamless synchronization is possible, while providing the driver with a better user experience.

Hardware Diagram

Figure 4:
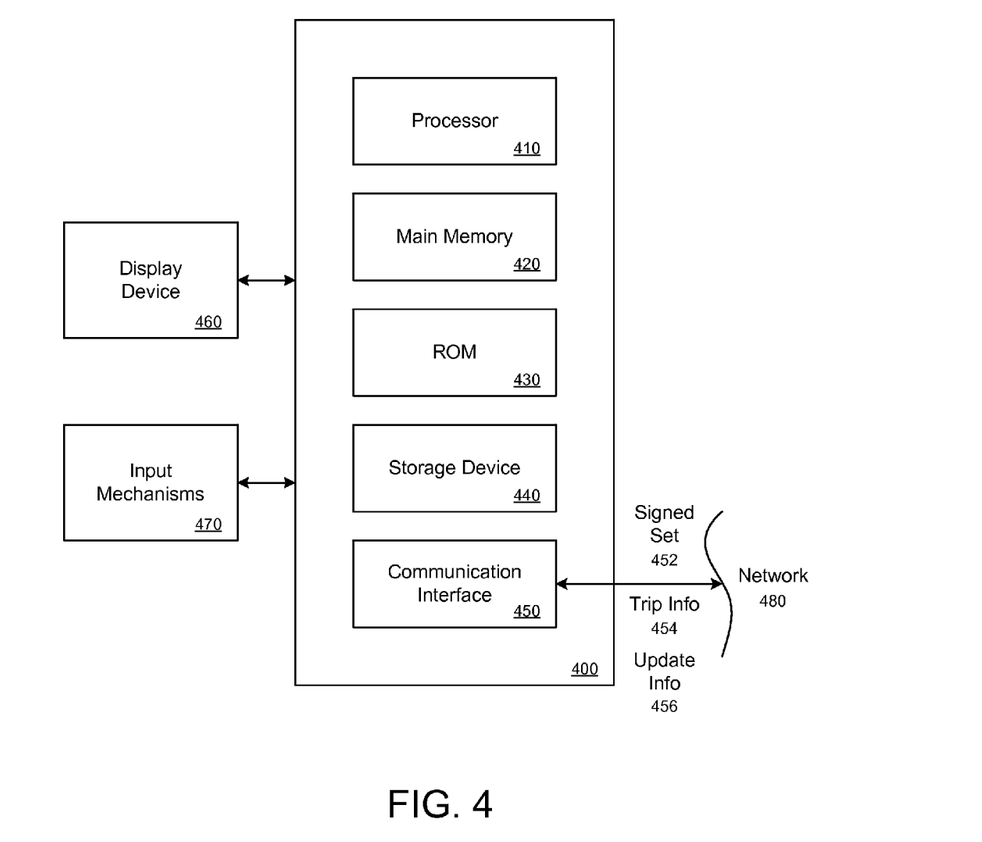
FIG. 4 is a block diagram that illustrates a computer system upon which examples described herein may be implemented.

FIG. 4 is a block diagram that illustrates a computer system upon which examples described herein may be implemented. For example, in the context of FIG. 1, the transport service system 100 may be implemented using a computer system such as described by FIG. 4. The transport service system 100 may also be implemented using a combination of multiple computer systems as described by FIG. 4 (e.g., multiple servers or datacenters).

In one implementation, computer system 400 includes processing resources 410, main memory 420, ROM 430, storage device 440, and a communication interface 450. Computer system 400 includes at least one processor 410 for processing information and a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a solid-state device, a magnetic disk, or an optical disk, is provided for storing information and instructions. For example, the storage device 440 can correspond to a computer-readable medium that stores instructions for performing operations discussed with respect to FIGS. 1 through 3B. In another example, the storage device 440 can store user and driver profiles and records for transport services, such as discussed with respect to FIGS. 1 through 3B.

The communication interface 450 can enable computer system 400 to communicate with one or more networks 480 (e.g., cellular network) through use of the network link (wireless and/or using a wire). Using the network link, computer system 400 can communicate with a plurality of devices, such as the mobile computing devices of the clients and service providers. According to some examples, computer system 400 can receive a transport request from a user, initialize information for the transport request, generate a record for the transport (including a set of initial service information), transmit an invitation message to a selected driver, receive an acceptance of the invitation, and update the set of initial service information with the identifier of the selected driver. Computer system 400 can also sign the set of initial service information using a signature of associated with the driver and provide the signed set 452 to the selected driver device via the network link. The processor 410 can also receive, via the network link, sets of trip information 454 periodically from the selected driver device. If there are any network connection outages with the driver device during the progress of the transport service, computer system 400 can receive updated sets of information 456 (along with the signed set 452 previously transmitted to the driver device) from the driver device at a later time (after the network connection with the driver device is reestablished).

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
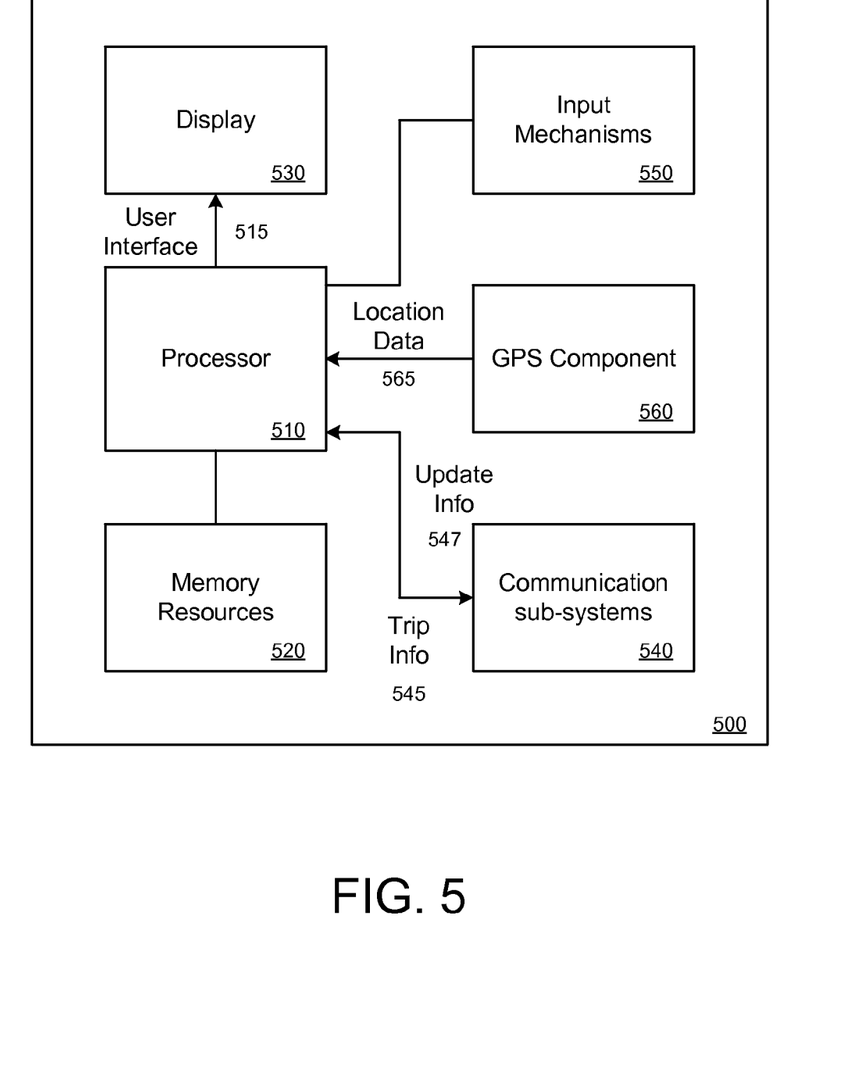
FIG. 5 is a block diagram that illustrates a mobile computing device upon which examples described herein may be implemented.

FIG. 5 is a block diagram that illustrates a mobile computing device upon which examples described herein may be implemented. In one example, a mobile computing device 500 may correspond to a mobile computing device, such as a cellular device that is capable of telephony, messaging, and data services. The mobile computing device 500 can correspond to a client device or a driver device. Examples of such devices include smartphones, handsets or tablet devices for cellular carriers. Mobile computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIGS. 1 through 3B, and elsewhere in the application. Processor 510 is configured, with instructions and data stored in the memory resources 520, to operate a service application as described in FIGS. 1 through 3B. For example, instructions for operating the service application in order to display user interfaces can be stored in the memory resources 520 of the mobile computing device 500.

A service provider, for example, can operate a mobile computing device (such as the mobile computing device 500) to operate a service application. The GPS component 570 can determine location information, such as the current location information 565 of the computing device 500. The processor 510 can execute instructions (e.g., corresponding to the service application) to perform operations, including determining trip information 545 in connection with the performance of a transport service. Trip information 545, which can include the location information 565, can be wirelessly transmitted to the transport service system via the communication sub-systems 540 periodically. In addition, when the driver provides an input (via input provided with respect to a user interface 515) to change a state of the transport service, trip information 545 can also be transmitted to the transport service system. As discussed, in some instances, a network connection between the mobile computing device 500 and the datacenter(s) implementing the transport service system can be lost. During this time, trip information 545 can be stored in a record for the transport service, such as a record stored in one or more memory resources 520. When the network connection is reestablished, the processor 510 can transmit updated information 547, which includes or corresponds to sets of information not received by the transport service system during the system outage and/or a signed set of initial service information, via the communication sub-systems 540.

For example, the processor 510 can provide a variety of content to the display 530 by executing instructions and/or applications that are stored in the memory resources 520. One or more user interfaces 515 can be provided by the processor 510, such as a user interface for the service application. While FIG. 5 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for operating a mobile computing device, the method comprising:

storing, in a memory resource of the mobile computing device, a record for a transport service that is to be provided by a driver operating the mobile computing device;

during performance of the transport service, (i) periodically updating the record with sets of information including location data determined by a location detection device of the mobile computing device in connection with performance of the transport service at different instances in time, and (ii) concurrently and periodically transmitting the sets of information including location data to a transport service system over a network;

detecting, by the mobile computing device, a loss of network connectivity between the mobile computing device and the transport service system during performance of the transport service;

in response to detecting the loss of network connectivity between the mobile computing device and the transport service system, continuing, by the mobile computing device, to periodically update the record of the mobile computing device with sets of information including location data determined by the location detection device in connection with performance of the transport service without periodically transmitting the sets of information to the transport service system; and upon reestablishing network connectivity between the mobile computing device and the transport service system, (i) determining a duration of time corresponding to the loss of network connectivity, and (ii) transmitting, by the mobile computing device to the transport service system, one or more sets of information including location data from the periodically updated record during the duration of time.

2. The method of claim 1, further comprising:
receiving, over the network, an invitation to provide the transport service for a user from the transport service system;
receiving, via an input mechanism of the mobile computing device, user input corresponding to an acceptance of the invitation; and
transmitting, over the network, a message for accepting the invitation to the transport service system;
wherein the transport service system determines a set of initial service information in response to receiving the message and provides the set of initial service information to the mobile computing device, the set of initial service information being stored in the record for the transport service.

3. The method of claim 2, wherein the set of initial service information includes (i) an identifier of the user, (ii) an identifier of the driver, and (iii) an identifier of the transport service for the user.

4. The method of claim 3, wherein the set of initial service information is signed by the transport service system using a signature, the signature being associated with the identifier of the driver.

5. The method of claim 4, wherein transmitting, by the mobile computing device to the transport service system, the one or more sets of information including location data determined during the duration of time includes transmitting, to the transport service system, the signed set of initial service information with the one or more sets of information.

6. The method of claim 1, wherein periodically updating the record with sets of information including location data determined by the location detection device in connection with performance of the transport service is performed at a first rate, and wherein periodically transmitting the most recent set of information including location data to the transport service system is performed at a second rate that is identical to the first rate.

7. The method of claim 1, wherein periodically updating the record with sets of information including location data determined by the location detection device in connection with performance of the transport service is performed at a first rate, and wherein periodically transmitting the most recent set of information including location data to the transport service system is performed at a second rate, the second rate being slower than the first rate.

8. The method of claim 1, wherein the loss of network connectivity with the transport service system corresponds to at least (i) a loss of cellular network connectivity, (ii) an outage of the transport service system, or (iii) a failover of the transport service system.

9. The method of claim 1, wherein the individual sets of information further includes a timestamp and a state information of the transport service at a time corresponding to the timestamp.

10. The method of claim 1, further comprising:
during performance of the transport service, (i) receiving, via an input mechanism of the mobile computing device, a user input corresponding to a change in state of the transport service, and (ii) in response to receiving the user input, updating the record with information about the change in state and transmitting, to the transport service system over the network, the information about the change in state.

11. A mobile computing device comprising:
a network interface;
a memory storing instructions; and
a processor, coupled to the network interface and the memory, to execute the instructions, wherein the instructions, when executed, cause the mobile computing device to:
store, in a memory resource of the mobile computing device, a record for a transport service that is to be provided by a driver operating the mobile computing device;
during performance of the transport service, (i) periodically update the record with sets of information including location data determined by a location detection device of the mobile computing device in connection with performance of the transport service at different instances in time, and (ii) concurrently and periodically transmit the sets of information including location data to a transport service system over a network;
detect, by the mobile computing device, a loss of network connectivity between the mobile computing device and the transport service system during performance of the transport service;
in response to detecting the loss of network connectivity between the mobile computing device and the transport service system, continue, by the mobile computing device, to periodically update the record of the mobile computing device with sets of information including location data determined by the location detection device in connection with performance of the transport service without periodically transmitting the sets of information to the transport service system; and
upon reestablishing network connectivity between the mobile computing device and the transport service system, (i) determine a duration of time corresponding to the loss of network connectivity, and (ii) transmit, by the mobile computing device to the transport service system, one or more sets of information including location data from the periodically updated record during the duration of time.

12. A computer program product for operating a mobile computing device, the computer program product stored on a non-transitory computer readable medium and including instructions for causing at least one processor to execute steps comprising:
- storing, in a memory resource of the mobile computing device, a record for a transport service that is to be provided by a driver operating the mobile computing device;
- during performance of the transport service, (i) periodically updating the record with sets of information including location data determined by a location detection device of the mobile computing device in connection with performance of the transport service at different instances in time, and (ii) concurrently and periodically transmitting the sets of information including location data to a transport service system over a network;
- detecting, by the mobile computing device, a loss of network connectivity between the mobile computing device and the transport service system during performance of the transport service;
- in response to detecting the loss of network connectivity between the mobile computing device and the transport service system, continuing, by the mobile computing device, to periodically update the record of the mobile computing device with sets of information including location data determined by the location detection device in connection with performance of the transport service without periodically transmitting the sets of information to the transport service system; and
- upon reestablishing network connectivity between the mobile computing device and the transport service system, (i) determining a duration of time corresponding to the loss of network connectivity, and (ii) transmitting, by the mobile computing device to the transport service system, one or more sets of information including location data from the periodically updated record during the duration of time.

13. The computer program product of claim 12, further comprising instructions for:
- receiving, over the network, an invitation to provide the transport service for a user from the transport service system;
- receiving, via an input mechanism of the mobile computing device, user input corresponding to an acceptance of the invitation; and
- transmitting, over the network, a message for accepting the invitation to the transport service system;
- wherein the transport service system determines a set of initial service information in response to receiving the message and provides the set of initial service information to the mobile computing device, the set of initial service information being stored in the record for the transport service.

14. The computer program product of claim 13, wherein the set of initial service information includes (i) an identifier of the user, (ii) an identifier of the driver, and (iii) an identifier of the transport service for the user.

15. The computer program product of claim 14, wherein the set of initial service information is signed by the transport service system using a signature, the signature being associated with the identifier of the driver.

16. The computer program product of claim 15, wherein transmitting, by the mobile computing device to the transport service system, the one or more sets of information including location data determined during the duration of time includes transmitting, to the transport service system, the signed set of initial service information with the one or more sets of information.

17. The computer program product of claim 12, wherein periodically updating the record with sets of information including location data determined by the location detection device in connection with performance of the transport service is performed at a first rate, and wherein periodically transmitting the most recent set of information including location data to the transport service system is performed at a second rate that is identical to the first rate.

18. The computer program product of claim 12, wherein periodically updating the record with sets of information including location data determined by the location detection device in connection with performance of the transport service is performed at a first rate, and wherein periodically transmitting the most recent set of information including location data to the transport service system is performed at a second rate, the second rate being slower than the first rate.

19. The computer program product of claim 12, wherein the loss of network connectivity with the transport service system corresponds to at least (i) a loss of cellular network connectivity, (ii) an outage of the transport service system, or (iii) a failover of the transport service system.

20. The computer program product of claim 12, wherein the individual sets of information further includes a timestamp and a state information of the transport service at a time corresponding to the timestamp.

21. The computer program product of claim 12, further comprising instructions for:
- during performance of the transport service, (i) receiving, via an input mechanism of the mobile computing device, a user input corresponding to a change in state of the transport service, and (ii) in response to receiving the user input, updating the record with information about the change in state and transmitting, to the transport service system over the network, the information about the change in state.

* * * * *